April 5, 1927.
R. B. FAGEOL
1,623,584
SPACER CLAMP FOR BUMPERS
Filed Nov. 11, 1925
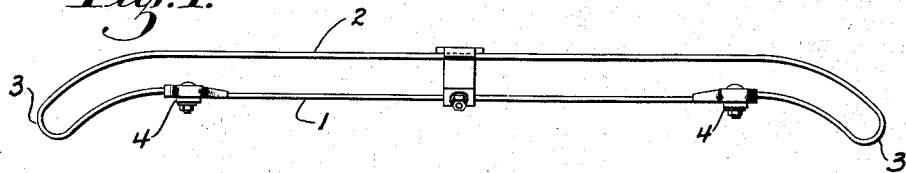
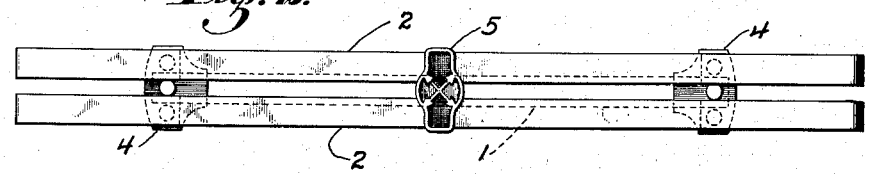
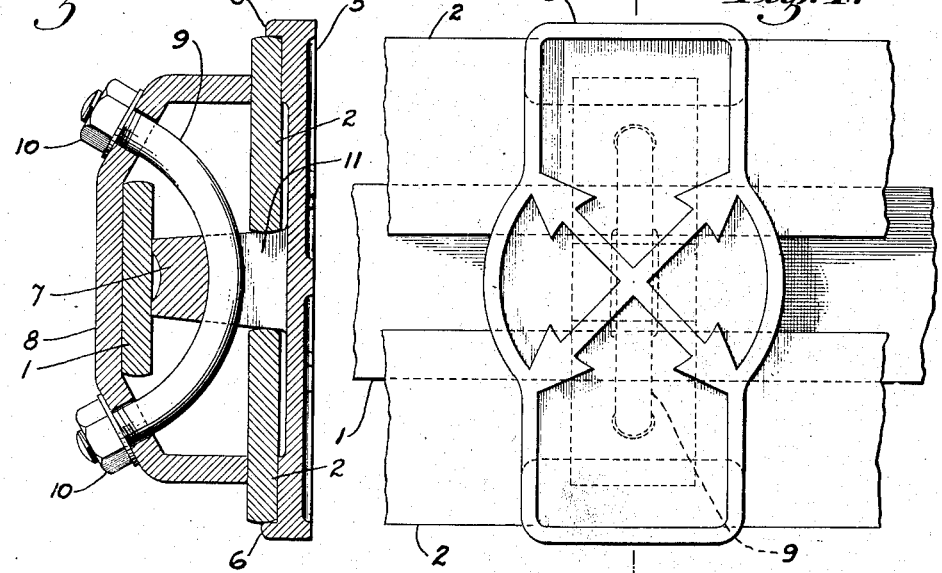
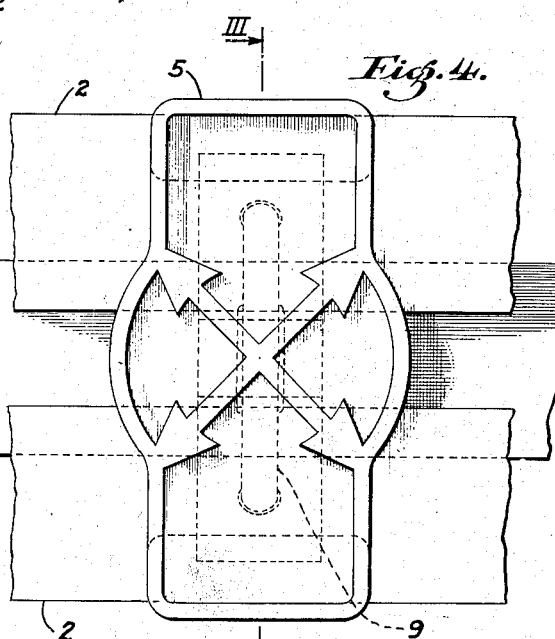
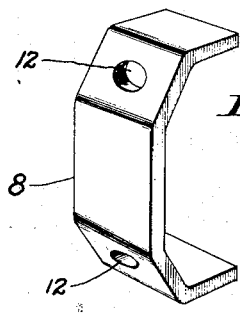
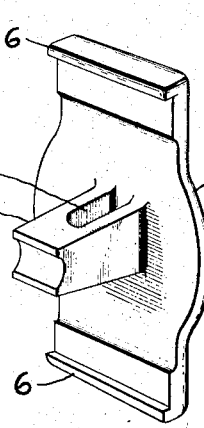
INVENTOR.
Rollie B. Fageol.
BY Dewey, Strong,
Townsend & Loftus
ATTORNEYS.

Patented Apr. 5, 1927.

1,623,584

UNITED STATES PATENT OFFICE.

ROLLIE B. FAGEOL, OF LOS ANGELES, CALIFORNIA, ASSIGNOR TO AMERICAN CHAIN COMPANY, INC.

SPACER CLAMP FOR BUMPERS.

Application filed November 11, 1925. Serial No. 68,310.

This invention relates to a spacer clamp for automobile bumpers, the purpose of such a clamp being to secure the intermediate portion of the front and rear bars of an automobile bumper in relatively fixed spaced relation. Such clamping of the bars permits the flexible movement of the bars but only as a unit, thereby greatly strengthening the bumper and preventing easy distortion of the front bar or bars thereof. It is the primary object of the invention to provide an improved and readily detachable spacer clamp for this purpose.

In the accompanying drawing I have shown one specific embodiment of my invention, but it will be understood that the invention can be otherwise embodied and that the drawing is not to be construed as defining or limiting the scope of the invention, the claims appended to this specification being relied upon for that purpose.

In the drawing:

Figure 1 is a plan view of a bumper provided with my improved spacer clamp.

Figure 2 is a front view thereof.

Figure 3 is an enlarged sectional view of the clamp taken on line III—III of Figure 4.

Figure 4 is an enlarged front elevation of the clamp showing the same applied to the bumper as in Figure 2.

Figures 5 and 6 show the rear and front clamping plates.

Referring more specifically to the drawing by reference characters, 1 indicates the rear bar of an automobile bumper and 2 the twin front bars thereof, the front bars being bent upon themselves at the ends 3 of the bumper and the extreme ends of the front and rear bars being connected together by clamps 4. The bars as illustrated are made from flat resilient material as is well known in bumpers of this type.

My invention herein relates particularly to an improved spacer clamp for cooperating with the intermediate portion of the front and rear bars of an automobile bumper to hold such bars in relatively fixed spaced relation, whereby the same can move together resiliently in the usual manner but cannot so move independently. As hereinafter described, it will be obvious that the use of this clamp greatly strengthens the bumper and prevents distortion of the front bar or bars thereof.

My improved spacer clamp comprises a front plate 5 adapted to engage over the front surface of the twin front bars 2, there being end projections 6 for engaging over the top and bottom edges of the bars as illustrated. A lug 7 projects rearwardly from the central portion of this front plate 5 in a manner adapted to extend between the twin bars 2 and engage against the rear bar 1. A U-shaped rear plate 8 is adapted to engage the rear face of the rear bar 1 and the ends thereof to engage against the front bars 2. A rod or bolt 9 and nuts 10 thereon are provided for binding the lug 7 and plate 8 together in a manner holding the front and rear bars in a fixed spaced relation. The rod extends through a hole 11 in the lug 7 and through holes 12 in the plate 8. When in the clamped position illustrated in Figure 3, the bars 1 and 2 are held securely clamped against both forward and rearward relative movement. It will be understood however that the bars can move together in the usual resilient manner and that the front bar is reinforced by the rear bar whereby easy distortion of the front bar, as might be done when unsupported by the rear bar, is prevented. As illustrated in the drawing, it will be seen that my improved clamp may be made of an ornamental design and that the same may be readily detached from the bumper merely by removing one of the nuts 10.

It should be particularly noted that my improved bumper clamp engages and cooperates with the bumper bars in a solely frictional manner, no drilling of the bars whereby the same would be weakened or any change therein whatever, being necessary. The frictional engagement of the clamp against the front and rear sides of the bars holds the intermediate portion of the bars in spaced relation in a reinforcing manner, while permitting flexibility of the bars at opposite sides of the clamp, which flexibility would not be attained by a clamp secured positively to the bars.

Having thus described my invention, what I claim is:

1. In a bumper, the combination of a pair of horizontally spaced flexible bumper bars, a plate engaging over the front surface of the intermediate portion of the front bar and having a rearwardly extending lug, a cooperating plate engaging over the rear surface of the rear bar, and means engaging the rear plate and lug to hold the bars in a fixed spaced relation.

2. In a bumper, the combination of a pair of horizontally spaced flexible bumper bars, the front bar comprising a pair of twin bars vertically spaced, a plate engaging over the front surface of the twin bars and having a lug extending rearwardly therebetween, a cooperating plate engaging over the rear surface of the rear bar, and means engaging the rear plate and lug to hold the front and rear bars in a fixed spaced relation.

3. In a bumper, the combination of horizontally spaced front and rear flexible bumper bars, a plate engaging over the front surface of the intermediate portion of the front bar and having a rearwardly extending lug engaging against the rear bar, a cooperating plate engaging over the rear surface of the rear bar and engaging against the front bar, and means engaging the rear plate and lug to hold the front and rear bars in fixed relation by means of the parts engaging the same.

4. A spacer clamp for bumpers, comprising a front plate having a lug extending outwardly from the rear face thereof, a rear plate for engaging against a rear bumper bar, and means engaging the rear plate and lug to hold the front and rear plates together in a manner clamping a front and the rear bumper bars against relative lateral movement.

5. A spacer clamp for bumpers, comprising a front plate having a lug extending outwardly from the rear face thereof, a rear plate for engaging against a rear bumper bar, the lug having a hole therethrough and the rear plate having a pair of holes therethrough, and a bolt extending through the holes and holding the plates together in a manner adapted to clamp the front and rear bars of the bumper against relative lateral movement.

6. A spacer clamp for bumpers, comprising a front plate having a lug extending outwardly from the center of the rear face thereof, a U-shaped rear plate for engaging against a rear bumper bar and adapted to engage against the rear face of a cooperating front bumper bar, and a locking element engaging the rear plate and lug to hold the front and rear plates together in a manner adapted to clamp the front and rear bumper bars against relative lateral movement.

ROLLIE B. FAGEOL.